United States Patent [19]
Wenger

[11] Patent Number: 4,539,467
[45] Date of Patent: Sep. 3, 1985

[54] ELECTRICALLY HEATED CUTTING TOOL

[75] Inventor: Helmut Wenger, Kranzberg, Fed. Rep. of Germany

[73] Assignee: Zangl GmbH, Munich, Fed. Rep. of Germany

[21] Appl. No.: 488,276

[22] Filed: Apr. 25, 1983

[30] Foreign Application Priority Data

Apr. 26, 1982 [DE] Fed. Rep. of Germany ....... 3215503

[51] Int. Cl.$^3$ ........................ H05B 3/02; B29C 17/10; B26D 7/10

[52] U.S. Cl. ...................................... 219/233; 30/140; 83/171; 219/230; 219/235; 219/240

[58] Field of Search ............... 219/221, 227, 229, 230, 219/233, 235, 240; 83/170, 171, 15, 16; 30/140

[56] References Cited

U.S. PATENT DOCUMENTS

| | | | |
|---|---|---|---|
| 1,584,371 | 5/1926 | Griffiths | 30/140 X |
| 1,834,555 | 12/1931 | Tittle | 219/235 X |
| 2,200,322 | 5/1940 | Arnesen | 219/230 X |
| 2,310,844 | 2/1943 | Draeger | 219/233 X |
| 2,314,865 | 3/1943 | Bierwirth | 219/235 X |
| 2,421,125 | 5/1947 | Krebs | 219/235 X |
| 2,430,496 | 11/1947 | Dodge | 219/221 UX |
| 2,476,612 | 7/1949 | Lobdell | 219/233 X |
| 3,263,540 | 8/1966 | Lefevre | 83/171 |
| 3,558,854 | 1/1971 | Siegel et al. | 219/227 X |
| 3,992,605 | 11/1976 | Kraus et al. | 219/233 |

FOREIGN PATENT DOCUMENTS

| | | | |
|---|---|---|---|
| 185569 | 5/1956 | Austria | 219/235 |
| 846881 | 8/1952 | Fed. Rep. of Germany | 219/233 |
| 1916527 | 5/1965 | Fed. Rep. of Germany | . |
| 1213596 | 12/1966 | Fed. Rep. of Germany | . |
| 1515265 | 11/1969 | Fed. Rep. of Germany | 219/233 |
| 1943189 | 7/1971 | Fed. Rep. of Germany | . |
| 2132853 | 1/1972 | Fed. Rep. of Germany | . |
| 532498 | 8/1955 | Italy | 219/235 |

*Primary Examiner*—A. Bartis
*Attorney, Agent, or Firm*—Ostrolenk, Faber, Gerb & Soffen

[57] ABSTRACT

An electrically heated excising or cutting tool for cutting rubber, plastic, and the like includes a handle carrying at one end a cutting blade of flat resistive material through which current flows to produce heat. The blade is substantially U-shaped with limbs having free ends clamped to contact pieces on the handle connected to the poles of a power supply. The blade is bent at right angles to the plane of the flat material in the region between the free ends of the limbs and the bight portion of the U-shaped blade to define a cutting region having a first limb disposed in a cutting direction from the second limb. The first limb is reduced in cross-sectional area at the bend to increase the production and concentration of heat in the cutting region to counteract the increased heat dissipation in the cutting region caused by the accumulation of excised material thereat. A cooling device is provided on the handle for cooling the parts of the blade away from the cutting region to reduce the transfer of heat to the handle and to simultaneously result in an increase in heat generation in the cutting portion of the blade due to the increase in electrical resistance in that region. The contact pieces are provided with openings to further reduce heat transfer to the handle.

10 Claims, 11 Drawing Figures

ELECTRICALLY HEATED CUTTING TOOL

BACKGROUND OF THE INVENTION

The invention relates to an electrically heated cutting tool for cutting rubber and plastics, the tool comprising a blade of flat material through which current flows, the blade being substantially U-shaped and having two limbs, the free ends of which are connected with the two poles of a power supply. In a known tool of this art (German Pat. No. 1 943 189) the knife takes the form of a flat blade the limbs of which end in the connecting region, i.e. in the region where the limbs are connected together, in a V-shaped or acute angled cutting edge. A cutting tool of this kind makes it possible to cut rubber and plastics without waste so long as the location of the cut and/or the line along which the cut is to be made are freely accessible. For cutting locations which are difficult to reach, for example when cutting adhesively secured panes for vehicles, the use of the known blade is difficult if not indeed impossible.

SUMMARY OF THE INVENTION

The principal object underlying the invention is to provide an electrically heated cutting tool of the initially named kind which also makes it possible to cut material in locations where access is difficult.

This object is solved in accordance with the invention, by bending the blade at right angles to the plane of the material in a region between the free ends of the limbs and the connecting region.

Advantageous modifications and developments of the invention are set forth in the appended subordinate claims.

The cutting tool of the invention makes it possible, as a result of its angled form, to cut even in locations which are difficult to reach and makes it possible, by way of example, to cut adhesively secured panes away from vehicles.

In accordance with an advantageous modification of the invention, the foremost limb, as seen in the cutting direction, is of reduced width in the region of the bend and adjacent thereto so that the strongest heating occurs in this region. This is particularly advantageous for the named application, namely the cutting tool of adhesively secured window panes, because in this application material accumulates in the region of the bend, i.e. in the edge of the recess which accommodates the pane and leads to rapid heat dissipation and thus to cooling of the blade. The reduction of the width of the limb at this location, or at another location at which, depending on the application, increased heat dissipation occurs, allows the distribution of the heat to be very accurately controlled.

In accordance with a further advantageous embodiment of the invention, a cooling device is provided which cools the part of the blade which lies outside of the cutting region so that a further concentration of heat occurs in the cutting region itself because the hotter regions of the knife have a larger resistance.

As a considerable power is required to sufficiently heat the knife, the cutting tool is preferably fed via leads connected with a power supply, as otherwise the arrangement of a transformer in the cutting tool itself would make the weight of the cutting tool too large. This arrangement presupposes that the power supply to the blade must be capable of being switched within the current circuit of the blade itself i.e. on the secondary side of a transformer which forms the power supply. In order to avoid problems with establishing contact with such high currents, the switch is preferably constructed in the form of an actuating lever biased in the direction of switching off with the actuating lever carrying a contact plate which is provided with a contact at one end, with this contact cooperating with a fixed contact. This contact is, for example, connected with the feed lead and the contact plate itself is in this case connected with one of the contact pieces via a flexible wire. In this manner the two current junctions across contact surfaces necessary with other switches are avoided.

The cooling device can preferably be switched on and off in dependence on the actuation of the switch and for this purpose detectors, known per se, are provided for the voltage drop along the secondary winding of the transformer and/or for the curent flowing on the secondary side.

In order to reduce the heat transfer as far as possible, cut-outs which reduce the heat conduction can also be provided in the contact pieces in the region between the housing and the clamping plates which clamp the blade.

The invention will now be described in the following in more detail with reference to the embodiment illustrated in the drawing.

DETAILED DESCRIPTION OF THE PREFERRED EMBODIMENTS

Figure 1:
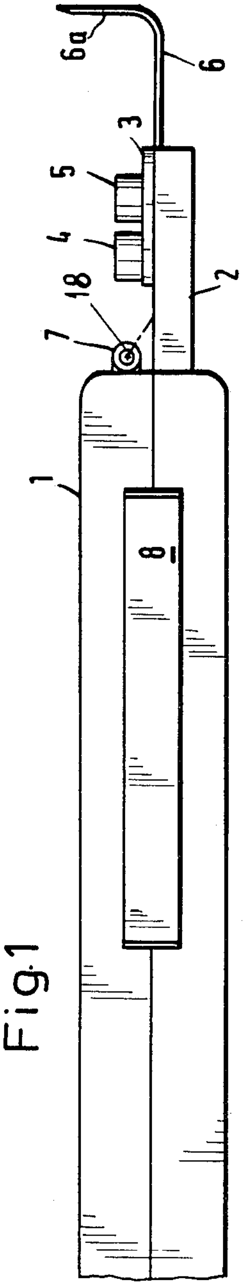
FIG. 1 shows a side view of an embodiment of the cutting tool.
Figure 2:
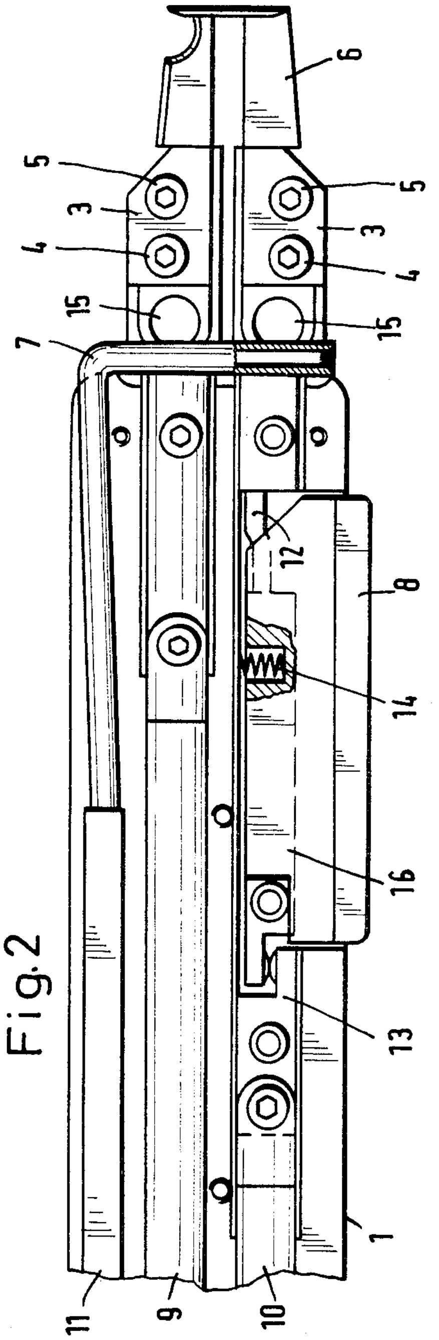
FIG. 2 shows a partly sectioned plan view of the cutting tool of FIG. 1, FIGS. 3*a*–3*d* show a first embodiment of a cutting blade for the cutting tool of FIGS. 1 and 2, FIGS. 4*a*–4*d* show a second embodiment of blade for the cutting tool of FIGS. 1 and 2.

The embodiment of the electrically heated cutting tool shown in FIGS. 1 and 2 has a housing 1 to which contact pieces 2 are secured. The contact pieces 2 cooperate with clamping plates 3 in order to clamp a blade 6. The clamping blades 3 are pressed with the aid of screws (set bolts) 4, 5 against the blade which is in contact with the contact pieces 2, thus providing a reliable electrical contact.

Electrical feed lines or leads 9, 10 and also a hose 11 which supplies a cooling device 7, which will later be explained in more detail, with cooling air extend through the housing. The lead 9 is directly connected with one of the contact pieces 2 whereas the other lead 10 can be connected with the other contact piece 2 via a switch actuatable by an actuating lever 8. Having regard to the relatively large currents flowing through the blade, the switch consists of a contact plate 16 embedded in the actuating lever 8 with the contact plate 16 being connected with the associated contact piece 2 via a flexible wire 12 and having a contact which can be brought into contact 17 with a fixed contact 13 on actuation of the actuating lever. The actuating lever is biased by a spring 14 in such a way that the electrical circuit from the lead 10 to the associated contact piece 2 is interrupted. The free end of a cooling tube 7 extends above the blade 6 and is provided with air outlet openings 18 which are directed towards the clamping plates and the blade. In operation the cooling air is introduced into the cooling tube 7 via the hose 11 so that parts of the blade 6 which are not in cutting engagement are cooled. In this manner the regions of the blade which are located outside of the actual location of the cut are held at a low temperature so that the heat generation of the remaining regions of the blade due to the increase in resistance is concentrated in these other regions.

As can be recognized from FIGS. 1 and 2, and also in particular from FIGS. 3*a–d* and 4*a–d*, the blade 6 has an angled portion 6*a* which can extend at any desired angle to the remaining region of the blade. The case of a right angled bend illustrated in the drawings represents only a special case which is suitable, by way of example, for the already named application, namely the cutting out of adhesively secured vehicle window panes. As can be recognized from FIGS. 3*a* and 3*b* and also FIGS. 4*a* and 4*b*, the width of the foremost limb 6*b* of the blade as seen in the cutting direction, is reduced at area 6*f* in the region of the bend and also adjacent thereto, so that heat concentration occurs in this region. This is in particular advantageous because during cutting, an accumulation of material occurs in this region and this accumulation results in a comparatively large heat dissipation.

Naturally this reduction of the width can also be extended to the bend region of the other regions of the foremost limb seen in the cutting direction so that a corresponding adaptation of the blade to the cutting conditions and to the heat dissipation which occurs is possible.

Figure 4A:
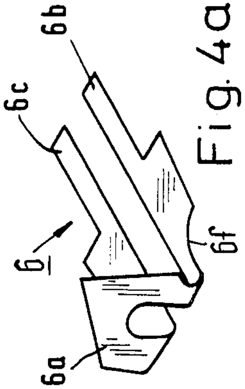
Figure 4B:
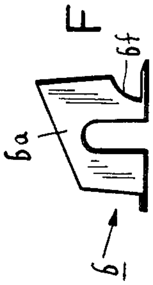
Figure 4C:
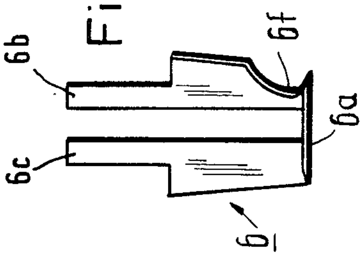
Figure 4D:
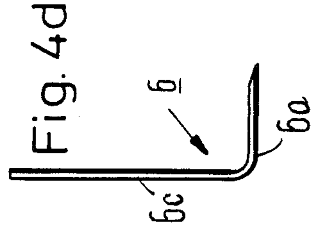
Figure 3A:
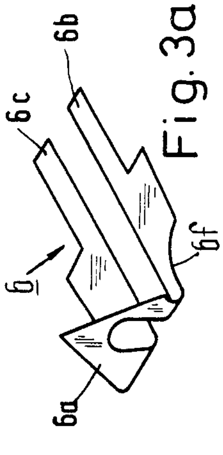
Figure 3B:
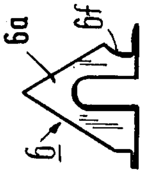
Figure 3C:
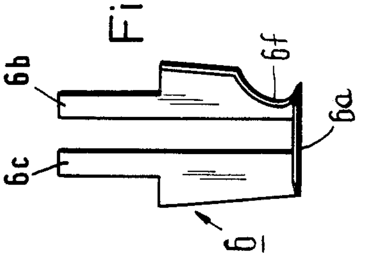
Figure 3D:
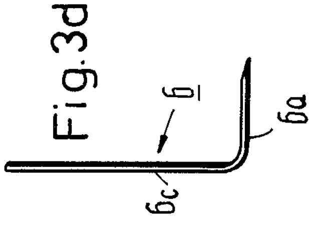

As can further be seen from FIGS. 3*b* and 4*b*, the reduction of the width results in a cutting point in the bend region 6*a* which facilitates the penetration of the blade into the material to be cut.

The angled region 6*a* which connects the two limbs 6*b* and 6*c* of the blade can either be acutely angled with equal sides in the manner shown in FIG. 3*b* or can be asymmetrically constructed depending on the application, in accordance with FIG. 4*b*.

Figure 5:
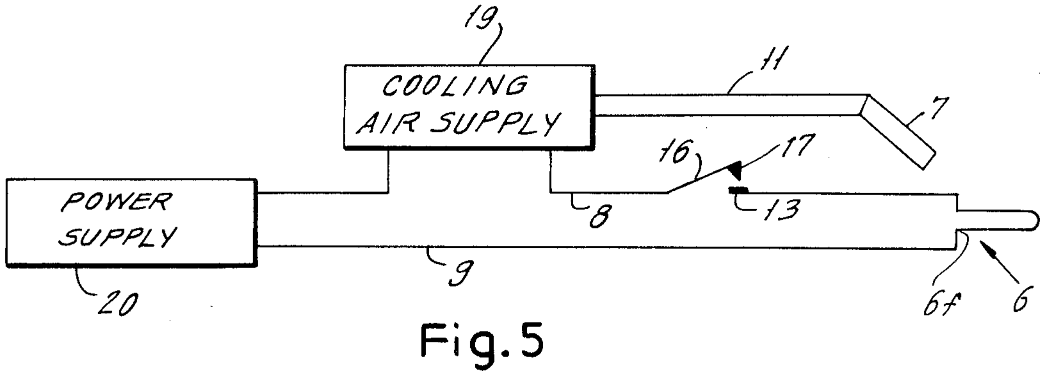
FIG. 5 is a schematic view of the electrical circuit for the blade and cooling apparatus of FIGS. 1 and 2.

In order to avoid heat transfer from the blade and/or from the contact pieces 2 to the housing, the contact pieces 2 are provided with cut-outs which are shown in FIG. 2 as circular openings. These openings 15 considerably reduce the heat transfer through the contact pieces, do not however lead to a significant increase in the resistance of the contact pieces, the dimensions of which are principally determined by the mechanical loads which occur during cutting. These bores 15 result, in particular in combination with the cooling air from the cooling tube 7 in significant reduction of the heating up of the housing 1. The feeding of the cooling air into the hose 11 can be controlled in dependence of the actuation of the switch via the electrical feed circuit for the blade, as shown in FIG. 5. The supply 19 of cooling air can, if necessary, be interrupted in the switched off condition or the quantity of cooling air can be reduced. The supply of cooling air can be switched on and off in dependence on the actuation of switch operator 8 which closes the electrical circuit through the blade.

I claim:

1. An electrically heated cutting tool for cutting rubber, plastic and the like, comprising:

a housing;

first and second contact pieces on the housing, each for being electrically connected to a respective pole of a power supply;

a blade of flat material for cutting through a substance in a cutting direction, the blade being substantially U-shaped and having first and second limbs and a connecting region therebetween connecting the first and second limbs; each of the first and second limbs having a respective free end disposed away from the connecting region for being connected to a respective one of the first and second contact pieces for permitting current to flow through the blade from the contact pieces; the limbs of the blade having a bent region between the free ends and the connecting region and being bent at right angles to the plane of the flat material in the bent region; the first limb of the blade being disposed in the cutting direction from the second limb and having a reduced width in and immediately adjacent to the bent region; and first and second clamping plates, each clamping the free end of a respective one of the first and second limbs of the blade to the respective one of the first and second contact pieces.

2. A cutting tool in accordance with claim 1, further comprising an air cooling device for providing a cooling airstream for cooling the contact pieces and the limbs of the blade, the cooling air stream being directed toward the contact pieces and the limbs.

3. An electrically heated cutting tool for cutting rubber, plastic and the like, comprising:

a housing;

first and contact second pieces on the housing, each for being electrically connected to a respective pole of a power supply; and a blade of flat material for cutting through a substance in a cutting direction, the blade being substantially U-shaped and having first and second limbs and a connecting region therebetween connecting the first and second limbs; each of the first and second limbs having a respective free end disposed away from the connecting region and being connected to a respective one of the first and second contact pieces for permitting current to flow through the blade from the contact pieces; the limbs of the blade having a bent region between the free ends and the connecting region and being bent at right angles to the plane of the flat material in the bent region; the first limb of the blade being disposed in the cutting direction from the second limb and having a reduced width in and immediately adjacent to the bent region.

4. A cutting tool in accordance with claim 3, further comprising an air cooling device for providing cooling air for cooling the contact pieces and the limbs of the blade, the cooling air being directed toward the contact pieces and the limbs.

5. A cutting tool in accordance with claim 4, wherein the limbs extend generally in a longitudinal direction between the free ends and the connecting region, the cooling device comprising a tube extending transversely to the longitudinal direction, the tube having bores defined therein for directing cooling air toward the limbs, the cooling device further comprising a cooling air supply means for supplying cooling air to the tube.

6. A cutting tool in accordance with claim 5, further comprising a switch operable for switching on and off the flow of current through the blade, the cooling air supply means being responsive to the operation of the switch for switching the supply of cooling air on and off when the flow of current is switched on and off, respectively.

7. A cutting tool in accordance with claim 3, further comprising first and second feed lines, each electrically connecting a respective one of the first and second contact pieces to the respective pole of the power supply, the cutting tool further comprising a switch in the housing and connected in one of the feed lines for switching the flow of current through the blade on and off; the switch comprising an actuating lever movably mounted in the housing and movable between an actuating position and an interrupted position, the switch further comprising a contact plate on the actuating lever and a fixed contact on the housing, the contact plate and the fixed contact being in contact when the actuating lever is in the actuating position and being out of contact when the actuating lever is in the interrupted position; the switch further comprising a flexible wire for connecting the contact plate with one of said one feed line and the respective contact piece, the fixed contact being connected with the other of said one feed line and the respective contact piece.

8. A cutting tool in accordance with claim 3, further comprising first and second clamping plates, each clamping a respective one of the first and second limbs of the blade to the respective one of the first and second contact pieces, each of the contact pieces extending outward from the housing and having a respective cutout defined therein between the housing and the respective one of the clamping plates for reducing heat conduction from the blade to the housing.

9. An electrically heated cutting tool for cutting rubber, plastic and the like, comprising:

a blade of flat material for cutting through a substance, the blade being substantially U-shaped and having first and second limbs and a connecting region therebetween connecting the first and second limbs; each of the first and second limbs having a respective free end disposed away from the connecting region for being electrically connected to a respective pole of a power supply for permitting current to flow through the blade; the limbs of the blade having a bent region between the free ends and the connecting region and being bent at right angles to the plane of the flat material in the bent region; the limbs extending generally in a longitudinal direction between the free ends and the bent region; and an air cooling device for providing cooling air for cooling the limbs of the blade, the cooling device comprising a tube extending transversely to the longitudinal direction, the tube having bores defined therein for directing the cooling air toward the limbs, the cooling device further comprising a cooling air supply means for supplying cooling air to the tube.

10. A cutting tool in accordance with claim 9, further comprising a switch operable for switching on and off the flow of current through the blade, the cooling air supply means being responsive to the operation of the switch for switching the supply of cooling air on and off when the flow of current is switched on and off, respectively.

* * * * *